ATKINSON & MANNING.
Running-Gear.

No. 17,358.

Patented May 26, 1857.

UNITED STATES PATENT OFFICE.

CHARLES ATKINSON, OF DANVILLE, AND GILBERT S. MANNING, OF SPRINGFIELD, ILLINOIS.

IMPROVED CONSTRUCTION OF VEHICLES.

Specification forming part of Letters Patent No. 17,358, dated May 26, 1857.

*To all whom it may concern:*

Be it known that we, CHARLES ATKINSON, of Danville, in the county of Vermillion and State of Illinois, and GILBERT S. MANNING, of Springfield, in the county of Sangamon and State of Illinois, have invented a new and useful Improvement in the Construction of Vehicles; and we do hereby declare that the following is a full, clear, and exact description of the same, reference being had to the annexed drawings, making a part of this specification, in which—

Figure 1:
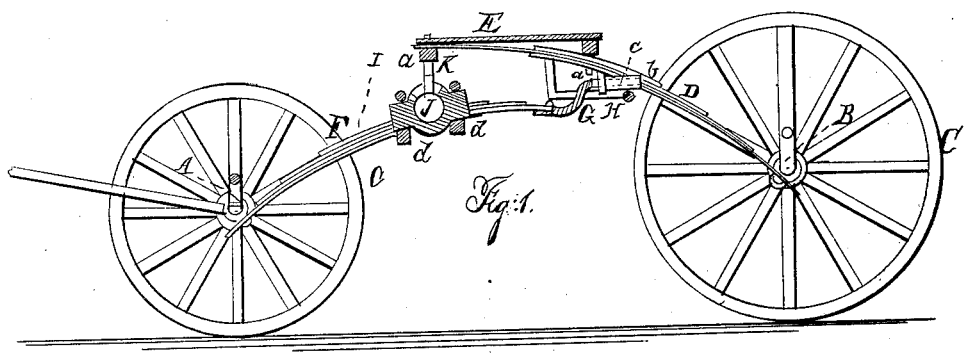
Figure 2:
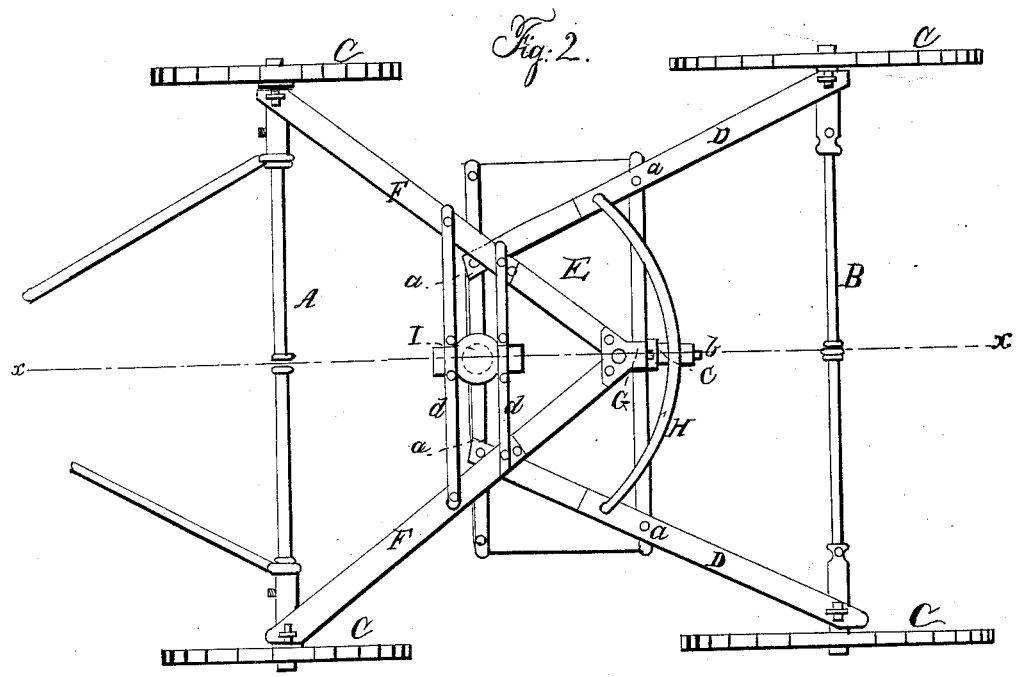

Figure 1 is a longitudinal vertical section of our improvement, the plane of section passing through the center, as indicated by the line $x\ x$, Fig. 2. Fig. 2 is an inverted plan of the same.

Similar letters of reference indicate corresponding parts in the two figures.

Our invention consists in connecting the back axle of the vehicle to the bed by means of springs and connecting the front axle to the bed by means of springs and a universal joint, the above parts being constructed and arranged as will be hereinafter fully shown and described, whereby the usual perch or reach is dispensed with and an independent movement allowed the front axle, so that as said axle passes over obstructions or is elevated and depressed at either end said movements will not affect the bed and body of the vehicle. The springs also by the above construction and arrangement render the body or seat quite easy and yielding, and the axles may also be so constructed as to admit the wheels to yield or give laterally to obstructions of any kind.

To enable those skilled in the art to fully understand and construct our invention, we will proceed to describe it.

A represents the front and B represents the back axle of a vehicle. C represents the wheels. To the back axle B two springs D D are attached. These springs are attached to the axle near its ends, as shown clearly in Fig. 2, and the inner ends of the springs are attached to the under side of the bed E, as shown at $a\ a$. The springs D D are formed of a series of leaves constructed of steel and placed one over the other in the usual way.

To the front axle A two similar springs F F are attached. The inner ends of these springs are connected to a plate G, which has a rod $b$ attached to it, said rod having a friction-roller $c$ upon it. This roller $c$ rests or bears upon a segment-guide H, the ends of which are attached one to each spring.

Both pairs of springs D D F F, it will be seen by referring to Fig. 2, converge from their outer to their inner ends, the springs F, however, converging more than the springs D. The springs F F have two transverse bars $d\ d$ attached to them, and to the center of these bars a spherical socket I is attached. Within the socket I a ball J is fitted, said ball being formed at the lower end of rod K, which supports the front end of the bed E.

The two axles A B are formed of steel or metal rods, and are of curved or bowed form.

By having the springs F of the front axle A attached to the bed E by means of the ball-and-socket joint, said axle is allowed a movement independent of the bed E, and the body of the vehicle is not subjected to all the jars and concussions which attend vehicles of the usual construction. For instance, when either of the front wheels passes over an obstruction the movement is not transmitted to the bed E, because the ball-and-socket joint permits the axle A and springs F to move independently of the bed. By having the bed E connected to the springs F D, as shown, the usual perch or reach is dispensed with, the bed and body thereon rendered more yielding than usual, and as the outer ends of the springs A B are attached to the outer ends of the axles, the axles may be constructed of light metal rods or bars of bowed or curved form, so as to allow the wheels to yield or give laterally.

The whole construction is extremely simple, economical, and durable.

Having thus described our invention, what we claim as new, and desire to secure by Letters Patent, is—

The construction of the vehicle as herein shown—viz., the two pairs of springs F F D D attached to the ends of the front and back axles A B, the springs D of the back axle being attached directly to the bed E, and the springs F of the front axle A attached to the bed E by the ball-and-socket joint, the inner ends of said springs F being attached to a plate G, provided with a friction-roller c, which rests or bears upon a segment-guide H, it being understood that we do not claim separately or in itself considered either of the parts above named, but only the several parts when considered as a whole and arranged as described.

CHAS. ATKINSON.
G. S. MANNING.

Witnesses to the signature of Charles Atkinson:
P. W. MOORE,
E. MOORE.

Witnesses to the signature of G. S. Manning:
S. B. MOODY,
E. C. MATHENY.